United States Patent
Yu et al.

(10) Patent No.: US 11,442,438 B2
(45) Date of Patent: Sep. 13, 2022

(54) AUTOMATED SUPERVISION AND INSPECTION OF ASSEMBLY PROCESS

(71) Applicant: The Boeing Company, Chicago, IL (US)

(72) Inventors: Huafeng Yu, Madison, AL (US);
Daniel S. ReMine, Madison, AL (US);
Tyler Charles Staudinger, Huntsville, AL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/523,762

(22) Filed: Jul. 26, 2019

(65) Prior Publication Data
US 2020/0057432 A1 Feb. 20, 2020

Related U.S. Application Data

(60) Provisional application No. 62/718,786, filed on Aug. 14, 2018.

(51) Int. Cl.
*G05B 19/418* (2006.01)
*G06N 20/00* (2019.01)
*G06K 9/62* (2022.01)

(52) U.S. Cl.
CPC ... *G05B 19/41885* (2013.01); *G05B 19/4188* (2013.01); *G05B 19/41875* (2013.01); *G06K 9/6201* (2013.01); *G06N 20/00* (2019.01)

(58) Field of Classification Search
None
See application file for complete search history.

(56) References Cited

U.S. PATENT DOCUMENTS

| 9,612,725 B1 | 4/2017 | Senesac | |
|---|---|---|---|
| 2012/0136470 A1* | 5/2012 | Deans | G05B 19/41875 700/110 |
| 2012/0308969 A1* | 12/2012 | Rataul | G05B 19/41865 434/224 |
| 2012/0327215 A1* | 12/2012 | Case | H05K 13/0815 348/92 |
| 2015/0012171 A1* | 1/2015 | Richter | B64F 5/60 701/32.9 |
| 2017/0024613 A1* | 1/2017 | Shivaram | G06K 9/3216 |
| 2017/0206428 A1 | 7/2017 | Weiss et al. | |
| 2018/0082414 A1 | 3/2018 | Rozenberg et al. | |
| 2019/0212721 A1* | 7/2019 | Kesler | G05B 19/41885 |

(Continued)

OTHER PUBLICATIONS

Remine et al., U.S. Appl. No. 16/523,790, filed Jul. 26, 2019.

(Continued)

*Primary Examiner* — Ryan A Jarrett
(74) *Attorney, Agent, or Firm* — Haynes and Boone, LLP

(57) ABSTRACT

A method and apparatus for performing automated supervision and inspection of an assembly process. The method is implemented using a computer system. Sensor data is generated at an assembly site using a sensor system positioned relative to the assembly site. A current stage of an assembly process for building an assembly at the assembly site is identified using the sensor data. A context for the current stage is identified. A quality report for the assembly is generated based on the sensor data and the context for the current stage.

30 Claims, 11 Drawing Sheets

(56) References Cited

U.S. PATENT DOCUMENTS

2020/0013156 A1\* 1/2020 Weiss .................... G06K 9/3233
2020/0133254 A1\* 4/2020 Cella .................... G06N 3/0445

OTHER PUBLICATIONS

Geometry Representations with Unsupervised Feature Learning, Yeo-Jin Yoon et al., 978-1-4673-8796-5/16, 2016 IEEE (6 pgs.).
Vote3Deep: Fast Object Detection in 3D Point Clouds Using Efficient Convolutional Neural Networks, Martin Engelcke et al., Oxford Robotics Institute, arXiv:1609.06666v2, 2017 (7 pgs.).
Anonymous, "Root cause analysis—Wikipedia", Jul. 18, 2018, Retrieve from Internet: <URL:http://en.wikipedia.org/w/index.php?title=Root_cause_analysis&oldid=850928391], [retrieve on Jun. 12, 2019].

\* cited by examiner

AUTOMATED SUPERVISION AND INSPECTION OF ASSEMBLY PROCESS

CROSS-REFERENCE TO RELATED APPLICATION

This application claims the benefit of the filing date of U.S. Provisional Application No. 62/718,786, entitled "Automated Supervision and Inspection of Assembly Process," filed Aug. 14, 2018, which is hereby incorporated by reference in its entirety. Further, this application is related to U.S. Provisional Application No. 62/718,812, entitled "Automated Supervision and Inspection of Assembly Process," filed Aug. 14, 2018; and U.S. patent application Ser. No. 16/523,790, entitled "Automated Supervision and Inspection of Assembly Process," filed on Jul. 26, 2019, which are hereby incorporated by reference in their entireties.

FIELD

The present disclosure relates generally to inspecting assembly sites. More particularly, the present disclosure relates to methods and systems for automated supervision and inspection of an assembly process at an assembly site.

BACKGROUND

Complex structures, such as aircraft structures, may require the assembly of hundreds, thousands, tens of thousands, or even hundreds of thousands of components. The assembly of these types of complex structures may present certain challenges in the manufacturing environment. For example, different types or levels of inspections may be needed at various stages of the assembly process. One inspection step may include determining whether the parts being assembled at a particular stage are indeed the parts expected to be assembled. Another inspection step may include determining whether parts have been assembled in the correct location. Yet another inspection step may include determining whether parts have been assembled at the correct time during the assembly process. One inspection step may include determining whether the assembly of parts meets safety requirements, quality requirements, or both.

Some currently available methods of inspection involve manual inspection of assemblies by a human operator. But this type of manual inspection may be prone to human error and may be less accurate than desired. Further, manual inspection may take longer than desired and may be more expensive than desired. For example, when an undesired feature is identified via manual inspection, disassembly may be required in order to identify the cause of the undesired feature. This disassembly process may be more time-consuming and costly than desired. Thus, one or more apparatuses and methods for addressing the above-described issues may be desired.

SUMMARY

In one example embodiment, a method is provided for performing automated supervision and inspection of an assembly process. The method is implemented using a computer system. Sensor data is generated at an assembly site using a sensor system positioned relative to the assembly site. A current stage of an assembly process for building an assembly at the assembly site is identified using the sensor data. A context for the current stage is identified. A quality report for the assembly is generated based on the sensor data and the context for the current stage.

In another example embodiment, a method is provided for performing automated supervision and inspection of an assembly process. The method is implemented using a computer system. Sensor data is generated at an assembly site using a sensor system positioned relative to the assembly site. A current stage of an assembly process for building an assembly at the assembly site is identified using the sensor data, assembly information stored in a data repository, and at least one of machine learning, deep learning, computer vision, a customized learning technique, computational learning, or artificial intelligence learning. A context is identified for the current stage. A quality report corresponding to the current stage of the assembly process is generated based on the sensor data and the context for the current stage. A record corresponding to the current stage of the assembly process is stored in the data repository to thereby build a history of records for the assembly process. The record includes at least a portion of the sensor data and the quality report.

In another example embodiment, a system for automated supervision and inspection of an assembly process includes a sensor system and a computer system. The sensor system is positioned relative to an assembly site and an assembly being built at the assembly site. The computer system identifies a current stage of the assembly process for building the assembly at the assembly site based on sensor data generated by the sensor system; identifies a context for the current stage; and generates a quality report for the assembly based on the sensor data and the context for the current stage.

The features and functions may be achieved independently in various embodiments of the present disclosure or may be combined in yet other embodiments in which further details may be seen with reference to the following description and drawings.

BRIEF DESCRIPTION OF THE DRAWINGS

The novel features believed characteristic of the example embodiments are set forth in the appended claims. The example embodiments, however, as well as a preferred mode of use, further objectives and features thereof, will best be understood by reference to the following detailed description of example embodiments when read in conjunction with the accompanying drawings, wherein:

DETAILED DESCRIPTION

The example embodiments described below provide methods and systems for automating the supervision and inspection of an assembly process at an assembly site. These methods and systems use machine learning, computer vision, and other artificial intelligence technologies to automate supervision and inspection of the assembly process. Further, these methods and systems provide an automated way of identifying that parts are assembled according to predefined quality requirements, in the right locations, and at the correct times during the assembly process.

The automated supervision and inspection system provided by the example embodiments improves quality control of an assembly process in a manner that reduces the need for human intervention in the inspection process. By reducing this need for human intervention, human-related errors may be reduced. Further, the automated supervision and inspection system provides cost- and time-savings. For example, the automated supervision and inspection system provides a method for identifying the root cause of an issue without requiring extensive disassembly or reversal of actual assembly steps.

Figure 1:
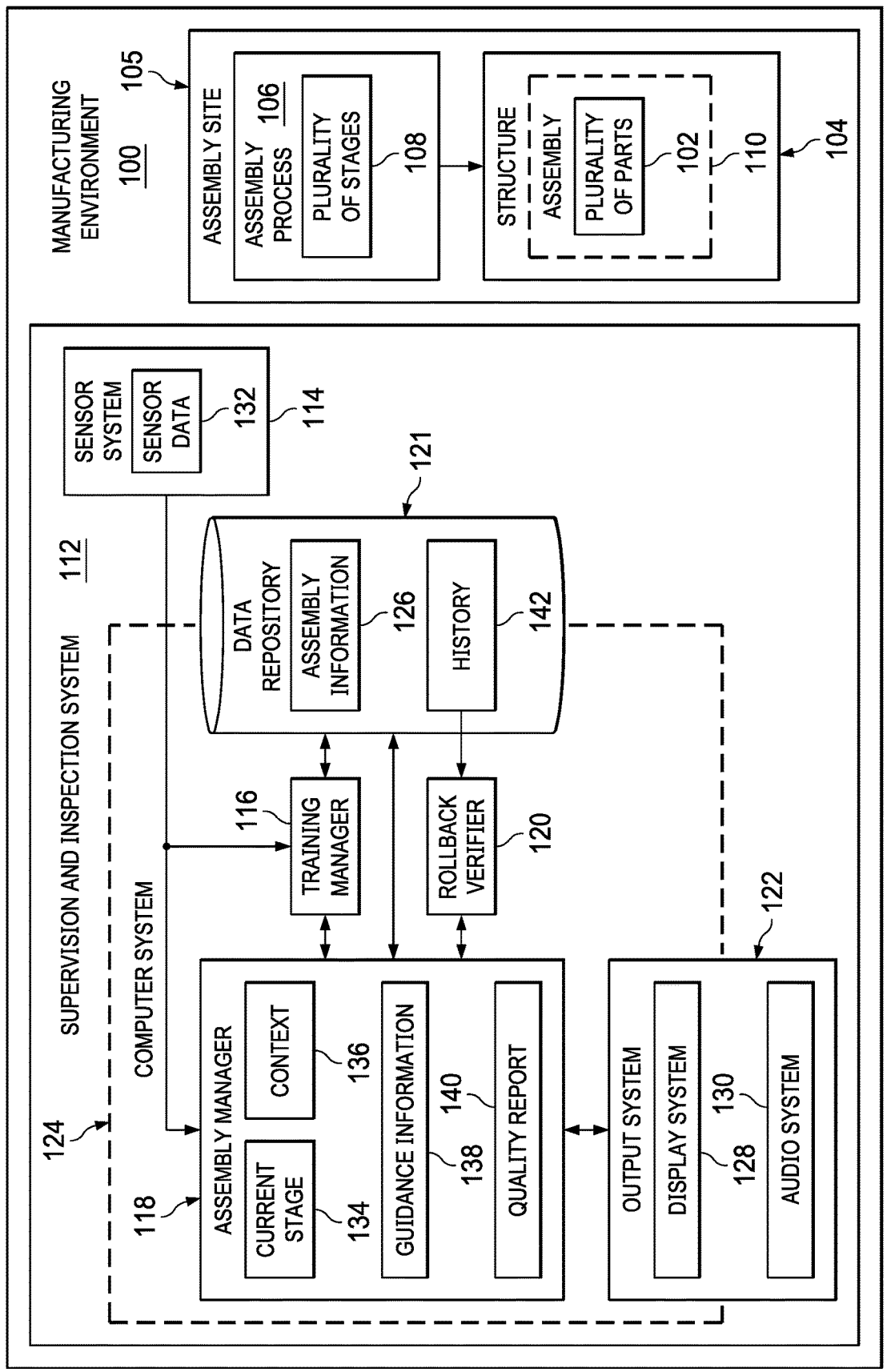
FIG. 1 is a block diagram of a manufacturing environment in accordance with an example embodiment.

FIG. 1 is a block diagram of a manufacturing environment in accordance with an example embodiment. Manufacturing environment 100 is an example of one type of manufacturing environment in which plurality of parts 102 may be assembled to form structure 104. Structure 104 may take a number of different forms. For example, structure 104 may be an aircraft, a wing, a wing structure, a fuselage, a fuselage structure, a frame, a stabilizer, or some other type of structure 104. In some cases, a part of plurality of parts 102 may also be referred to as a piece, a component, an element, a member, or some other type of unit.

Plurality of parts 102 may be assembled at assembly site 105 within manufacturing environment 100. In some illustrative examples, assembly site 105 may be one of multiple assembly sites within manufacturing environment 100. Assembly site 105 may include, for example, a ground area, a platform, scaffolding, or some other type of site on which plurality of parts 102 is assembled.

Plurality of parts 102 may be assembled to form structure 104 according to assembly process 106. Assembly process 106 may include plurality of stages 108. As used herein, a stage of plurality of stages 108 may be a single stage of assembly process 106, a sequence of stages, a sequence of sub-stages, a stage in a sub-assembly process, a step in assembly process 106 or a sub-assembly process, or two or more steps to be performed in parallel during assembly process 106. At any given stage of assembly process 106, prior to and up to completion, structure 104 may be referred to as assembly 110. In some cases, assembly 110 may also be referred to as a "build."

Supervision and inspection system 112 is used to supervise assembly process 106 and to perform inspections during assembly process 106. Supervision and inspection system 112 may be an automated system. In particular, supervision and inspection system 112 automates the supervision of assembly process 106 and automates inspections during assembly process 106 to reduce or, in some cases, even eliminate the need for human intervention.

In these illustrative examples, supervision and inspection system 112 includes sensor system 114, training manager 116, assembly manager 118, rollback verifier 120, data repository 121, and output system 122. Sensor system 114 may include any number of or combination of sensors. For example, sensor system 114 may include at least one of an imaging device, a radar sensor, a sonar sensor, a light detection and ranging (LiDAR) sensor, an infrared (IR) sensor, or some other type of sensor. An imaging device may include, for example, without limitation, a camera, a stereo camera, a video camera, an infrared camera, some other type of imaging device, or a combination thereof. In one illustrative example, sensor system 114 includes a set of imaging systems, each imaging system including one or more imaging devices. A set of items, such as a set of imaging systems, may include one or more items.

Training manager 116, assembly manager 118, and rollback verifier 120 may be implemented using software, hardware, firmware, or a combination thereof. When software is used, the operations performed by each of training manager 116, assembly manager 118, or rollback verifier 120 may be implemented using, for example, without limitation, program code configured to run on a processor unit. When firmware is used, the operations performed by each of training manager 116, assembly manager 118, or rollback verifier 120 may be implemented using, for example, without limitation, program code and data and stored in persistent memory to run on a processor unit.

When hardware is employed, the hardware may include one or more circuits that operate to perform the operations performed by each of training manager 116, assembly manager 118, or rollback verifier 120. Depending on the implementation, the hardware may take the form of a circuit system, an integrated circuit, an application specific integrated circuit (ASIC), a programmable logic device, or some other suitable type of hardware device configured to perform any number of operations. A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In these illustrative examples, assembly manager 118 and rollback verifier 120 may be implemented using computer system 124. Computer system 124 may include a single computer or multiple computers in communication with each other. In some embodiments, computer system 124 may include a laptop, a tablet, a smartphone, or some other type of mobile device.

In some embodiments, a portion of computer system 124 may be located remotely with respect to another portion of computer system 124. For example, computer system 124 may include a computer positioned at or around assembly site 105 within manufacturing environment 100 and a server system located remotely with respect to the computer. The server system may be located within or outside of manufacturing environment 100. In some cases, training manager 116 may be implemented using a first computer, assembly manager 118 may be implemented using a second computer, and rollback verifier 120 may be implemented using a third computer. Thus, computer system 124 may be used in a number of different ways to implement assembly manager 118 and rollback verifier 120.

Data repository 121 may include one or more databases, associative memory, some other type of data structure, or a combination thereof. Data repository 121 may be in communication with training manager 116, assembly manager 118, rollback verifier 120, or a combination thereof. Data repository 121 may be part of computer system 124 in some examples. In some examples, data repository 121 or at least a portion of data repository 121 is located remotely with respect to assembly site 105.

Data repository 121 stores assembly information 126. Examples of the types of assembly information 126 that may be stored in data repository 121 are described in FIG. 2 below.

Output system 122 may be in communication with training manager 116, assembly manager 118, rollback verifier 120, or a combination thereof. Output system 122 may include one or more output devices. In some illustrative examples, a portion or all of output system 122 may be considered part of computer system 124. In these illustrative examples, output system 122 may include at least one of display system 128, audio system 130, or some other type of output device. Display system 128 may include, for example, at least one of a screen, a touchscreen, a monitor, a head-mounted display device, or some other type of display device. Audio system 130 may include, for example, at least one of a microphone, a speaker, or some other type of audio device.

Sensor system 114 may be used to generate sensor data 132 before assembly process 106, during assembly process 106, or both. Sensor data 132 may include two-dimensional (2D) imaging data, three-dimensional (3D) imaging data, one or more other types of sensor data, or a combination thereof. Sensor data 132 is sent to training manager 116 and assembly manager 118 for processing. In some illustrative examples, a portion or all of sensor data 132 is stored in data repository 121.

Before assembly process 106 begins, training manager 116 uses assembly information 126, and, optionally, sensor data 132, to train assembly manager 118 to identify the various parts of plurality of parts 102 to be assembled to form structure 104 and the various stages of plurality of stages 108. Additionally, training manager 116 uses assembly information 126, and, optionally, sensor data 132, to train assembly manager 118 to assess quality metrics for assembly 110.

Assembly manager 118 processes sensor data 132 to identify current stage 134 of assembly process 106. Assembly manager 118 then identifies context 136 for current stage 134. Context 136 may include, for example, at least one of a nominal condition for assembly 110 at current stage 134, a nominal condition for each part expected to be present at current stage 134, selected tolerances for the nominal condition for assembly 110 at current stage 134, selected tolerances for the quality metrics pre-identified for assembly 110, an identification of step(s) completed prior to current stage 134, an identification of step(s) to be completed during current stage 134, an identification of next step(s) to be completed after current stage 134, or other information.

Context 136 may include information that a human operator would be either completely unable to identify or would be unable to quickly and easily identify based on viewing or visualizing assembly site 105. For example, when assembly process 106 includes a multitude of stages, a human operator may be unable to readily identify current stage 134 or the selected tolerances for the quality metrics pre-identified for assembly 110 for current stage 134, the step(s) completed prior to current stage 134, the step(s) to be completed during current stage 134, or next step(s) to be completed after current stage 134.

Based on context 136 identified for current stage 134, assembly manager 118 may output guidance information 138 via output system 122. Guidance information 138 may include, for example, a listing of the steps to be performed during current stage 134, a listing of next steps to be performed after current stage 134, or both. Guidance information 138 is used to inform one or more human operators on the tasks to be performed during assembly process 106.

Further, based on context 136 identified for current stage 134, assembly manager 118 may evaluate assembly 110 at current stage 134 and generate quality report 140. Quality report 140 may also be referred to as a quality assessment. Quality report 140 indicates whether any relevant issues of interest relating to the quality of assembly 110 are present.

For each stage of assembly process 106 identified by assembly manager 118, assembly manager 118 stores the corresponding quality report 140 in data repository 121 to build history 142 of reports for the assembly process 106. If at current stage 134, assembly manager 118 detects an issue of interest, rollback verifier 120 may roll back through the history 142 of quality reports stored in data repository 121 in reverse order to identify the root cause of the issue of interest.

Figure 2:
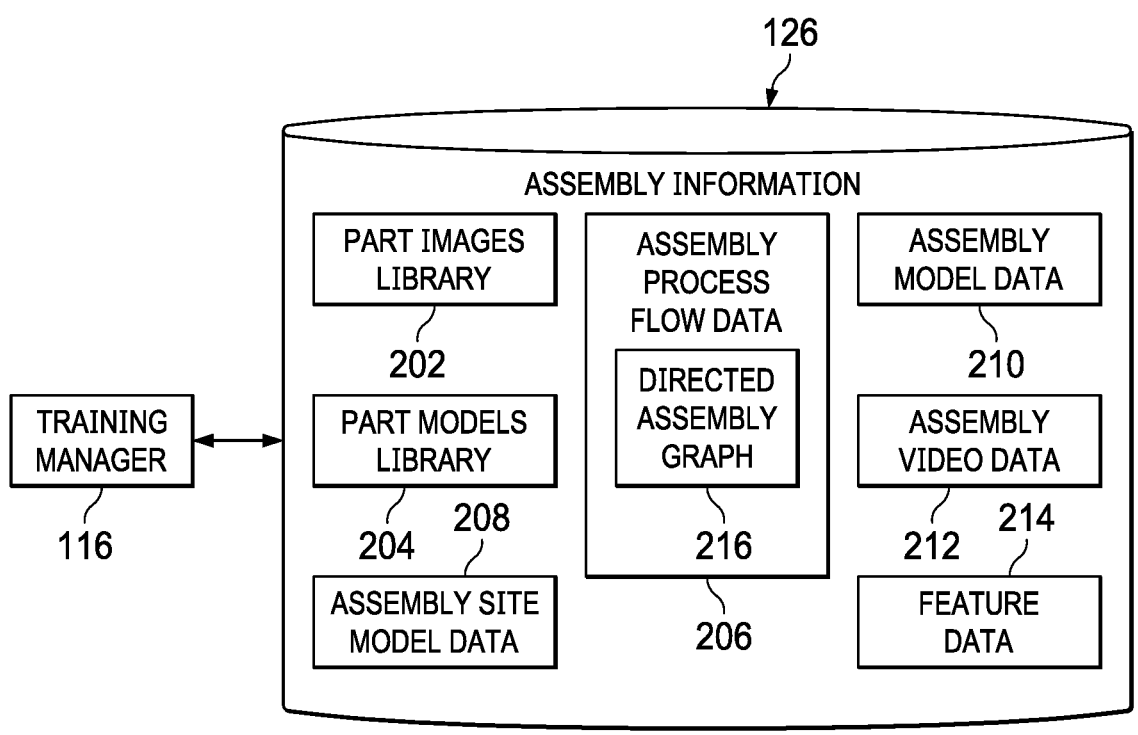
FIG. 2 is a block diagram of the training manager and data repository from FIG. 1 in accordance with an example embodiment.

FIG. 2 is a block diagram of training manager 116 and data repository 121 from FIG. 1 in accordance with an example embodiment. Before assembly process 106 from FIG. 1 is performed at assembly site 105, training manager 116 uses assembly information 126 stored in data repository 121 to train assembly manager 118 in FIG. 1 to evaluate each of plurality of stages 108 in FIG. 1.

Training manager 116 may use any number of algorithms and techniques to perform this training. For example, training manager 116 may use at least one of machine learning, deep learning, computer vision, some other type of computational learning, some other type of artificial intelligence learning, or a combination thereof.

Assembly information 126 stored in data repository 121 may include various types of information. For example, assembly information 126 may include part images library 202, part models library 204, assembly process flow data 206, assembly site model data 208, assembly model data 210, and assembly video data 212, feature data 214, or a combination thereof.

Part images library 202 may include, for example, one or more images for at least a portion of the parts of plurality of parts 102 in FIG. 1. In some cases, part images library 202 may include an image for each of plurality of parts 102. In these illustrative examples, part images library 202 may also include images of parts captured from previously completed assembly processes.

Part models library 204 may include, for example, one or more models for at least a portion of the parts of plurality of parts 102 in FIG. 1. In some cases, part models library 204 may include a model for each of plurality of parts 102. A model of a part may be, for example, a computer-aided design (CAD) model.

Assembly process flow data 206 may include information about the flow or sequence of plurality of stages 108 in assembly process 106 from FIG. 1. In one illustrative example, assembly process flow data 206 takes the form of directed assembly graph 216 that represents the flow or sequence according to which plurality of stages 108 of assembly process 106 should progress. In some cases, this directed assembly graph 216 may include sub-flows representing sub-stages that act in parallel with each other.

Assembly site model data 208 may include, for example, a baseline model of assembly site 105 from FIG. 1 and updates to the baseline model for each of plurality of stages 108 of assembly process 106. In some illustrative examples, assembly site model data 208 includes a model of assembly site 105 for each stage of plurality of stages 108. The models included in assembly site model data 208 may be, for example, three-dimensional models. Further, in some cases, these models may include representations of the parts involved in and already part of each stage of plurality of stages 108. In other cases, the models are linked to the CAD models of the parts.

Assembly model data 210 may include any number of models that represent the various states of assembly 110 in plurality of stages 108. In one illustrative example, assembly model data 210 includes a baseline model for assembly 110 at a first stage of plurality of stages 108 and updates to the baseline model reflecting the addition of one or more parts to assembly 110 at each of plurality of stages 108. Assembly video data 212 may include a video of the entire assembly process 106 or multiple videos for the various stages of assembly process 106 captured during a previously performed assembly process 106.

Feature data 214 may include information about various features. Features may include cracks, dents, twists, a surface level feature, other types of features, or a combination thereof. Feature data 214 may include images of these features. In these illustrative examples, feature data 214 includes selected tolerances for each of the features. As one illustrative example, feature data 214 may include selected tolerances for a length of crack, selected tolerances for a depth of a dent, and other types of selected tolerances.

In these illustrative examples, training manager 116 may use sensor data 132 that is generated over time to update assembly information 126. This type of updating improves the overall accuracy and efficiency with which analysis of sensor data 132 may be performed.

Figure 3:
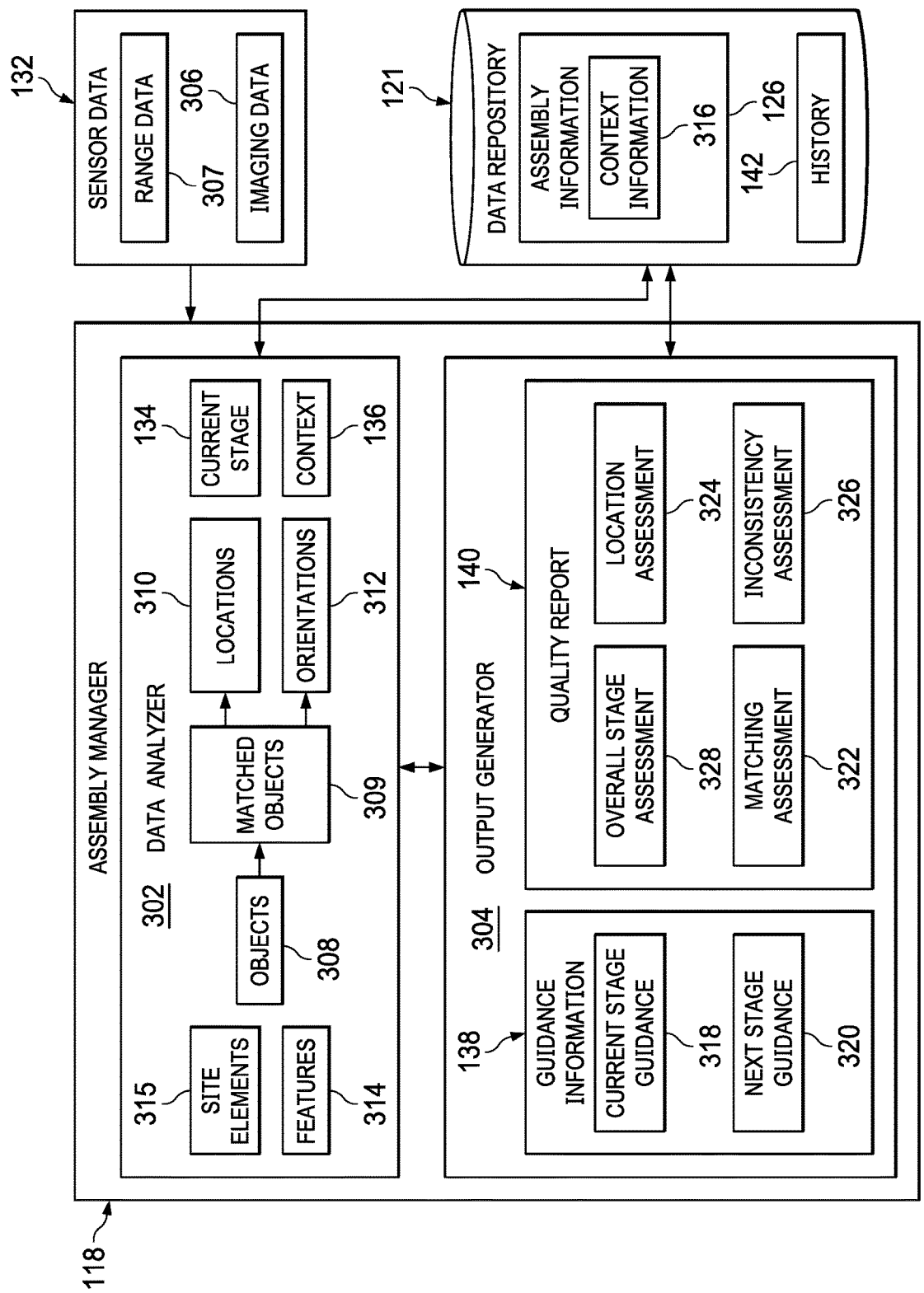
FIG. 3 is a block diagram of the assembly manager from FIG. 1 in accordance with an example embodiment.

FIG. 3 is a block diagram of assembly manager 118 from FIG. 1 in accordance with an example embodiment. Assembly manager 118 may include data analyzer 302 and output generator 304.

Data analyzer 302 uses sensor data 132 and assembly information 126 stored in data repository 121 to identify each stage of plurality of stages 108 during assembly process 106. For example, at any given point in time during assembly process 106, data analyzer 302 may use any number of algorithms or techniques to identify current stage 134 of assembly process 106.

In one illustrative example, sensor data 132 includes imaging data 306, range data 307, or both for assembly site 105. Imaging data 306 includes two-dimensional images, three-dimensional images, video, or a combination thereof of assembly site 105. Range data 307 may include data from at least one of a radar sensor, a LiDAR sensor, an infrared sensor, or some other type of sensor.

In these illustrative examples, data analyzer 302 may use at least one of machine learning, deep learning, computer vision, a customized learning technique, some other type of computational learning, some other type of artificial intelligence learning, or a combination thereof in combination with assembly information 126 to detect and identify objects 308 using imaging data 306, range data 307, or both. In some illustrative examples, data analyzer 302 may use only two-dimensional imaging data to detect and identify objects 308.

Data analyzer 302 matches the detected objects 308 to parts based on assembly information 126. For example, data analyzer 302 may use part images library 202, part models library 204, or both to match objects 308 to parts. This matching may be performed based on, for example, form, size, color, identifying marks, or some other type of point of comparison.

Once objects 308 are part-matched, they may be referred to as matched objects 309. In some cases, not all of objects 308 are able to be matched to corresponding parts. Thus, matched objects 309 may include all or a subset of objects 308.

Data analyzer 302 identifies locations 310 and orientations 312 of matched objects 309 with respect to a reference coordinate system for assembly site 105. For example, data analyzer 302 may first identify locations 310 of matched objects 309 in a particular image. Data analyzer 302 may synchronize a viewpoint from which that image was generated to a corresponding location of the imaging device that generated the image relative to a model of assembly site 105. Ray tracing or some other technique may be used to then determine the location of each matched object. The orientation of that matched object may then be determined. In other illustrative examples, data analyzer 302 identifies locations 310 and orientations 312 of matched objects 309 relative to a reference coordinate system for assembly 110.

Data analyzer 302 may identify one or more features 314 in imaging data 306. Features 314 may be features of a particular part, surface, or other portion of assembly 110. Features 314 may include, for example, without limitation, cracks, dents, twists, a surface level feature, or some other type of feature. A surface level feature may be, for example, a level of flushness, a level of smoothness, or some other type of surface feature. A feature may be considered an undesired feature or inconsistency when that feature is outside of selected tolerances.

Data analyzer 302 may use at least one of machine learning, deep learning, computer vision, a customized learning technique, some other type of computational learning, some other type of artificial intelligence learning, or a combination thereof in in combination with assembly information 126 to detect and identify objects 308 in imaging data 306.

In some illustrative examples, data analyzer 302 also identifies site elements 315 in imaging data 306. Site elements 315 may include tools, identifying marks, labels, robots, and elements other than parts that may be present at assembly site 105.

Using some combination of the identification of matched objects 309, locations 310 of matched objects 309, orientations 312 of matched objects 309, and site elements 315, data analyzer 302 is then able to identify current stage 134 of assembly process 106. For example, data analyzer 302 may use assembly information 126 in combination with the above information to identify current stage 134. More specifically, data analyzer 302 may use assembly process flow data 206, assembly site model data 208, assembly model data 210, assembly video data 212, some other type of information, or a combination thereof from FIG. 2 to identify current stage 134. In some cases, the identification of current stage 134 may be referred to as an assembly localization calibration or an assembly stage calibration.

Once current stage 134 has been identified, data analyzer 302 uses context information 316 stored in data repository 121 to identify context 136 for current stage 134. Context information 316 may also include a portion of assembly information 126. For example, context information 316 may include quality metrics for each stage of plurality of stages 108 of assembly process 106.

As discussed above, context 136 for current stage 134 may include at least one of a nominal condition for assembly 110 at current stage 134, a nominal condition for each part expected to be present at current stage 134, selected tolerances for the nominal condition for assembly 110 at current stage 134, selected tolerances for the quality metrics pre-identified for assembly 110, an identification of step(s) completed prior to current stage 134, an identification of step(s) to be completed during current stage 134, an identification of next step(s) to be completed after current stage 134, or other information.

Once context 136 has been identified, output generator 304 generates guidance information 138 and quality report 140. Guidance information 138 is used to inform the one or more human operators involved in assembly process 106. Guidance information 138 may include, for example, current stage guidance 318, next stage guidance 320, or both.

Current stage guidance 318 may include, for example, a listing of the steps to be performed during current stage 134. In some cases, current stage guidance 318 includes instructions on how to perform certain tasks for current stage 134. Current stage guidance 318 may include one or more images, video, or both to help guide a human operator on how to perform a particular task. Guidance information 138 may be displayed through display system 128 from FIG. 1. In some cases, current stage guidance 318 includes audio guidance, such as audio instructions on how to perform certain tasks during current stage 134 of assembly process 106. These audio instructions may be played for a human operator through audio system 130 from FIG. 1.

Next stage guidance 320 may include, for example, a listing of the steps to be performed during a next stage that will follow current stage 134. Data analyzer 302, output generator 304, or both may identify this next stage using, for example, directed assembly graph 216 from FIG. 2. In some illustrative examples, next stage guidance 320 includes instructions on how to perform certain tasks for the next stage. Next stage guidance 320 may include one or more images, video, or both to help guide a human operator on how to perform a particular task.

Guidance information 138 may be presented to a human operator through output system 122 described in FIG. 1. For example, guidance information 138 may be displayed through display system 128 from FIG. 1. In some cases, current stage guidance 318 may include audio guidance, such as audio instructions on how to perform certain tasks during current stage 134 of assembly process 106. These audio instructions may be played for a human operator through audio system 130 from FIG. 1.

Further, based on context 136 identified for current stage 134, matched objects 309, locations 310, orientations 312, and site elements 315, output generator 304 evaluates assembly 110 at current stage 134 and generates quality report 140. Quality report 140 indicates whether any relevant issues of interest relating to the quality of assembly 110 are present. For example, quality report 140 includes at least one of matching assessment 322, location assessment 324, inconsistency assessment 326, or some other type of assessment.

Matching assessment 322 may indicate whether one or more of objects 308 were unable to be matched to a corresponding part. In some illustrative examples, matching assessment 322 may also indicate whether one or more of matched objects 309 do not match the parts expected to be present at current stage 134 of assembly process 106. Location assessment 324 indicates whether matched objects 309 have been assembled in the correct or incorrect locations relative to assembly 110. Inconsistency assessment 326 indicates if features 314 have been identified and if so, whether features 314 are outside of selected tolerances. Data analyzer 302, output generator 304, or both may use feature data 214 from FIG. 2 to determine whether features 314 are outside of selected tolerances.

In some cases, quality report 140 may include overall stage assessment 328. Overall stage assessment 328 may be, for example, an indication of whether current stage 134 is progressing within selected tolerances. In some cases, overall stage assessment 328 may be a grade selected from one of "pass," "borderline," and "fail."

Quality report 140 may be presented to a human operator via output system 122 in different ways. In one illustrative example, quality report 140 may be presented using graphical indicators overlaid on an image of assembly site 105 or assembly 110 displayed in display system 128. For example, objects identified in the image that have been matched to correct parts and to correct locations and orientations may be indicated with a first type of graphical indicator (e.g., green circle around the object, green arrow, etc.). Objects identified in the image that have been mismatched, are in the wrong locations, or have the wrong orientations may be indicated with a second type of graphical indicator (e.g., red circle around the object, red arrow, etc.). As described above, a mismatched object may be one that matched to a part that should not be present at current stage 134 or that did not match to any part.

Sensor data 132 and the various pieces of information generated by assembly manager 118 are stored in data repository 121. For example, stage record 330 may be stored in data repository 121 in association with current stage 134. Stage record 330 may include sensor data 132, an identification of objects 308, an identification of matched objects 309, locations 310, orientations 312, and quality report 140. In some cases, stage record 330 may include guidance information 138. Once stored in data repository 121, stage record 330 becomes part of history 142. Thus, this type of history 142 of records includes a record for each stage of plurality of stages 108 identified and analyzed.

The illustrations in FIGS. 1-3 are not meant to imply physical or architectural limitations to the manner in which an example embodiment may be implemented. Other components in addition to or in place of the ones illustrated may be used. Some components may be optional. Further, the blocks are presented to illustrate some functional components. One or more of these blocks may be combined, divided, or combined and divided into different blocks when implemented in a different example embodiment.

Figure 4:
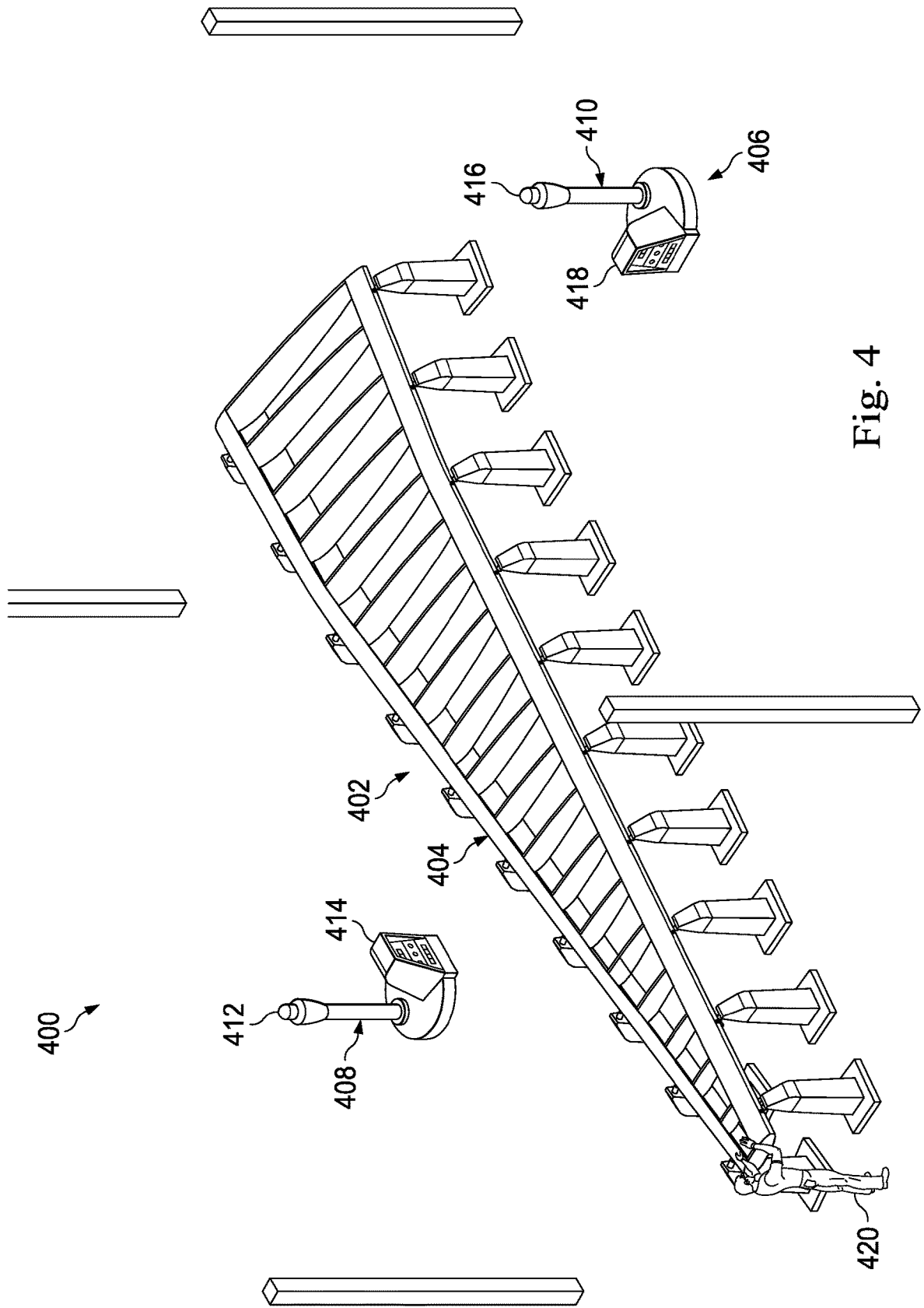
FIG. 4 is an illustration of an assembly site in accordance with an example embodiment.

FIG. 4 is an illustration of an assembly site in accordance with an example embodiment. Assembly site 400 may be an example of one implementation for assembly site 105 described in FIG. 1. Wing assembly 402 is being built at assembly site 400 to ultimately form a wing. Wing assembly 402 is an example of one implementation for assembly 110 described in FIG. 1. Wing assembly 402 is comprised of plurality of parts 404.

As depicted, supervision and inspection system 406 is at least partially present at assembly site 400. Supervision and inspection system 406 is an example of one implementation for supervision and inspection system 112 in FIG. 1. Supervision and inspection system 406 includes inspection platform 408 and inspection platform 410. In this illustrative example, inspection platform 408 and inspection platform 410 may be implemented using stationary platforms. In other illustrative examples, inspection platform 408 and inspection platform 410 may be implemented using mobile platforms. Although only two platforms are shown in FIG. 4, any number of platforms may be present at assembly site 400.

In this illustrative example, inspection platform 408 includes rotating camera 412 and control system 414. Similarly, inspection platform 410 includes rotating camera 416 and control system 418. Rotating camera 412 and rotating camera 416 are an example of one implementation for sensor system 114 in FIG. 1. Rotating camera 412 and rotating camera 416 may generate two-dimensional images. In other illustrative examples, inspection platform 408 and inspection platform 410 may be outfitted with three-dimensional camera systems, LiDAR sensor systems, or other types of sensors.

Control system 414 and control system 418 may each include a processor, memory, and communications units. Control system 414 and control system 418 may control the operation of rotating camera 412 and rotating camera 416, respectively. Further, control system 414 and control system 418 may process the imaging data generated by these cameras and send the processed data to a remote computer system (e.g., computer system 124 in FIG. 1) for further processing. In other illustrative examples, the processors of control system 414 and control system 418 communicate with each other as part of computer system 124 described in FIG. 1.

In some cases, a lighting device (not shown) may be attached to or integral with each of inspection platform 408 and inspection platform 410. The lighting device may help rotating camera 412 and rotating camera 416 to capture higher quality images.

The imaging data generated by rotating camera 412 and rotating camera 416 includes images of assembly site 400 and wing assembly 402 that are used to perform automated inspections during the building of wing assembly 402. Further, the imaging data is used to provide guidance to human operator 420 based on the current stage of assembly.

Figure 5:
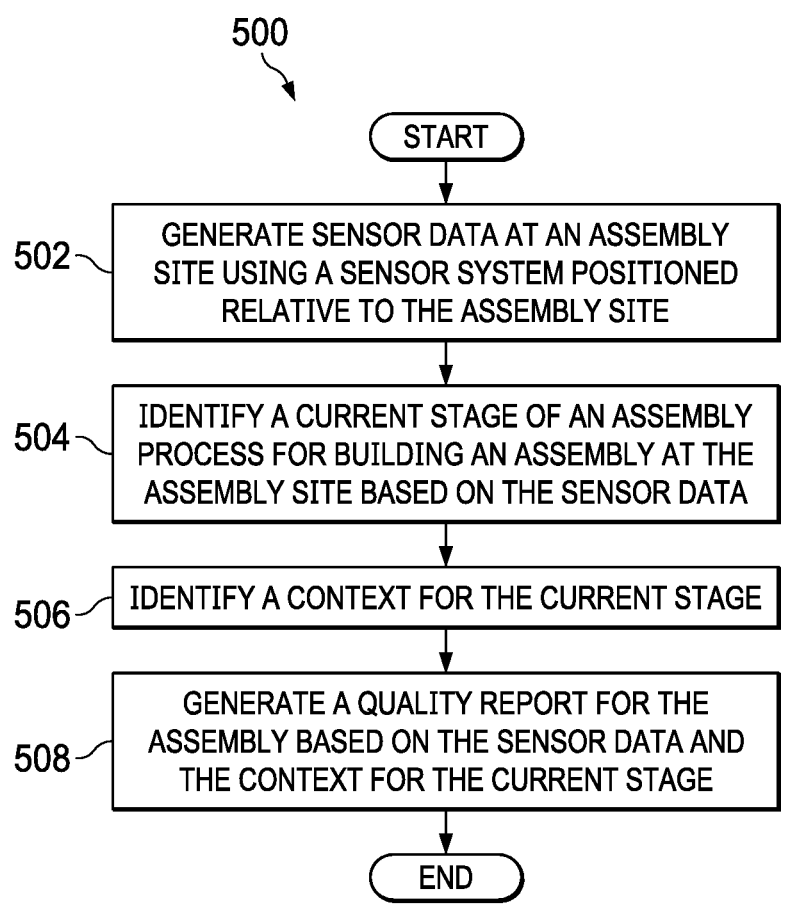
FIG. 5 is a flowchart of a process for performing automated supervision and inspection of an assembly process in accordance with an example embodiment.

FIG. 5 is a flowchart of a process for performing automated supervision and inspection of an assembly process in accordance with an example embodiment. Process 500 illustrated in FIG. 5 may be performed using supervision and inspection system 112 described in FIGS. 1-3. Process 500 may be used to automate the supervision and inspection of assembly process 106 at assembly site 105 in FIG. 1.

Process 500 may begin by generating sensor data at an assembly site using a sensor system positioned relative to the assembly site (operation 502). In one illustrative example, the sensor system includes a plurality of cameras that are positioned relative to the assembly site and the assembly being built at the assembly site. In some cases, one or more of the cameras may be rotating cameras.

A current stage of an assembly process for building the assembly at the assembly site is identified using the sensor data (operation 504). Thereafter, a context is identified for the current stage of the assembly process (operation 506). As described above, a stage of the assembly process may be a single stage, a sequence of stages, a sequence of sub-stages, a stage in a sub-assembly process, a step in the assembly process, a step in a sub-assembly process, or two or more steps or sub-stages to be performed in parallel during the assembly process.

A quality report is then generated for the assembly based on the sensor data and the context for the current stage (operation 508), with the process terminating thereafter. The quality report is an automated report that includes assessments indicating whether at least one issue of interest is present. The issue of interest may be an improper part, an improper part location, an improper orientation, a crack, a dent, a twist, a surface inconsistency, or a combination thereof. Process 500 may be repeated for each stage of the assembly process.

Figure 6:
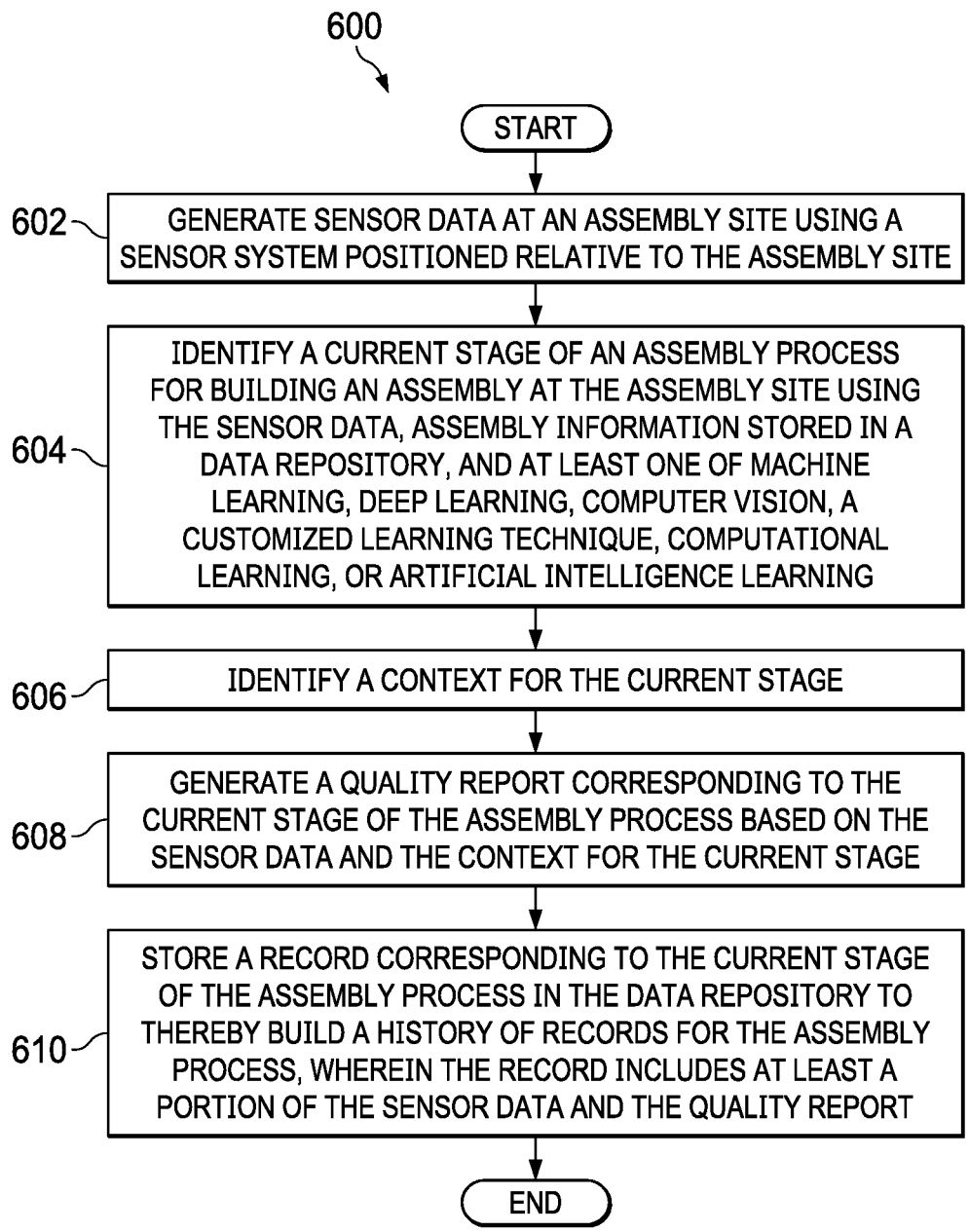
FIG. 6 is a flowchart of a process for performing automated supervision and inspection of an assembly process in accordance with an example embodiment.

FIG. 6 is a flowchart of a process for performing automated supervision and inspection of an assembly process in accordance with an example embodiment. Process 600 illustrated in FIG. 6 may be performed using supervision and inspection system 112 described in FIGS. 1-3. Process 600 may be used to automate the supervision and inspection of assembly process 106 at assembly site 105 in FIG. 1.

Process 600 begins by generating sensor data at an assembly site using a sensor system positioned relative to the assembly site (operation 602). In these illustrative examples, the sensor system includes multiple cameras that are placed in predetermined, fixed positions relative to the assembly being built at the assembly site. These positions are selected to provide images that provide the most information and optimal angles for evaluating the assembly process. The cameras may generate images, video, or both.

Next, a current stage of the assembly process for building an assembly at the assembly site is identified using the sensor data, assembly information stored in a data repository, and at least one of machine learning, deep learning, computer vision, a customized learning technique, computational learning, or artificial intelligence learning (operation 604). Thereafter, a context is identified for the current stage (operation 606).

A quality report corresponding to the current stage of the assembly process is generated based on the sensor data and the context for the current stage (operation 608). A record corresponding to the current stage of the assembly process is stored in the data repository to thereby build a history of records for the assembly process (operation 610), with the process terminating thereafter. The record includes at least a portion of the sensor data and the quality report.

Figure 7:
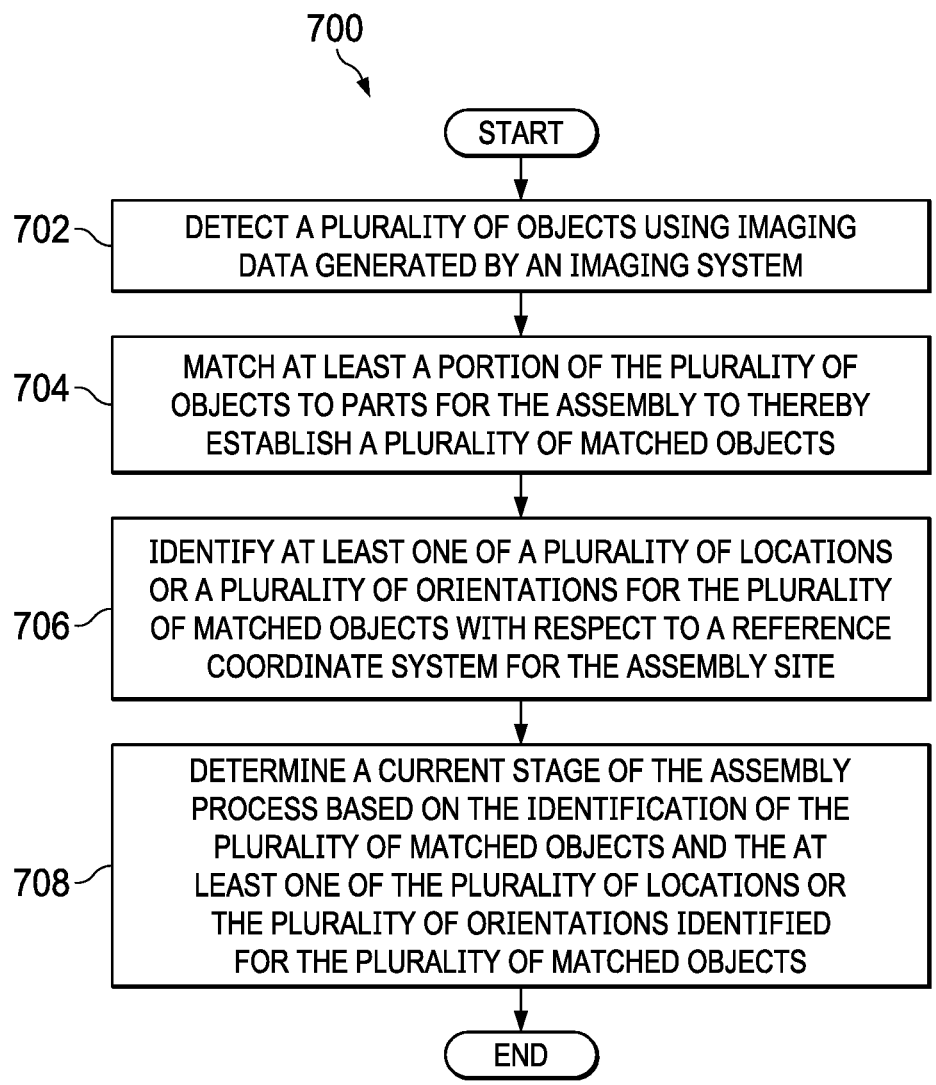
FIG. 7 is a flowchart of a process for identifying a current stage of an assembly process in accordance with an example embodiment.

FIG. 7 is a flowchart of a process for identifying a current stage of an assembly process in accordance with an example embodiment. Process 700 illustrated in FIG. 7 may be performed using supervision and inspection system 112 described in FIGS. 1-3. More particularly, process 700 may be performed using assembly manager 118 described in FIGS. 1 and 3.

Process 700 begins by detecting a plurality of objects using imaging data generated by an imaging system (operation 702). The imaging system may include one or more cameras positioned relative to an assembly site and an assembly at the assembly site.

Next, at least a portion of the plurality of objects is matched to parts for the assembly to thereby establish a plurality of matched objects (operation 704). Operation 704 may be performed using at least one of images of the parts or models of the parts. For example, operation 704 may be performed using part images library 202 and part models library 204 in FIG. 2. In operation 704, each object is compared to known parts for the assembly and is either matched to a known part or flagged as unmatched. In these illustrative examples, matching at least a portion of the plurality of objects to known parts for the assembly may be performed using at least one of machine learning, deep learning, computer vision, a customized learning technique, computational learning, or artificial intelligence learning.

Thereafter, at least one of a plurality of locations or a plurality of orientations is identified for the plurality of matched objects with respect to a reference coordinate system for the assembly site (operation 706). For example, for each object matched to a known part for the assembly being built, a location, an orientation, or both relative to a reference coordinate system for the assembly site is computed. In some illustrative examples, the reference coordinate system may be with respect to the assembly itself. The locations of the matched objects may be identified by using the known positions of the cameras relative to the assembly site and thus, the known positions of the cameras with respect a model (e.g., CAD model) of the assembly or the assembly site).

The current stage of the assembly process is determined based on the identification of the plurality of matched objects and the at least one of the plurality of locations or the plurality of orientations identified for the plurality of matched objects (operation 708), with the process terminating thereafter. Operation 708 may be performed by comparing the locations, orientations, or both of the matched objects to models of the assembly at various stages during the assembly process, models of the assembly site at various stages during the assembly process, or both. Assembly process flow data 206, assembly site model data 208, assembly model data 210, assembly video data 212, or a combination thereof, from FIG. 2, may be used to determine the current stage of the assembly process.

Figure 8:
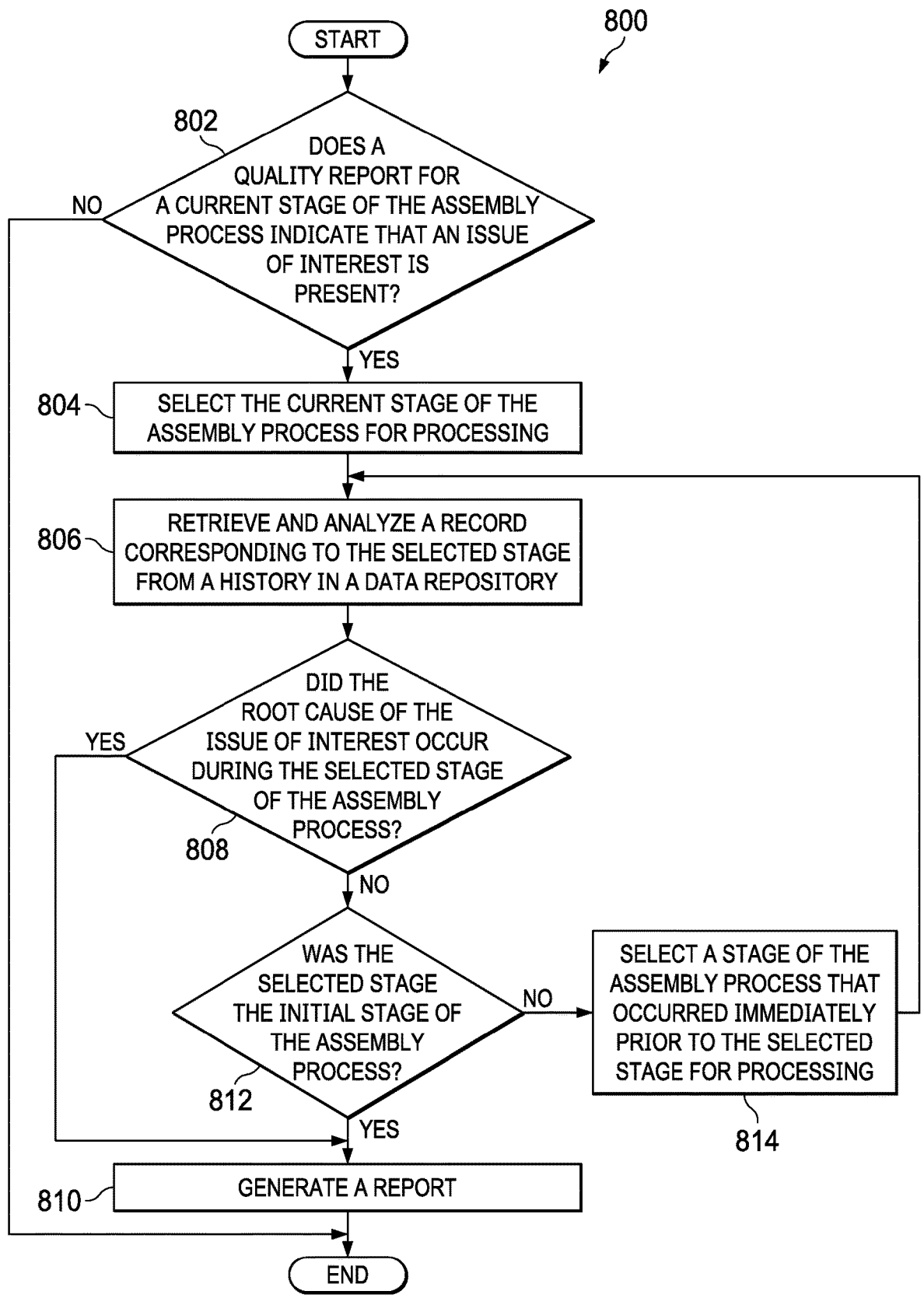
FIG. 8 is a flowchart of a process for performing a rollback verification in accordance with an example embodiment.

FIG. 8 is a flowchart of a process for performing a rollback verification in accordance with an example embodiment. Process 800 illustrated in FIG. 8 may be performed using supervision and inspection system 112 described in FIGS. 1-3. More particularly, process 800 may be performed using rollback verifier 120 described in FIG. 1.

Process 800 may begin by determining whether a quality report for a current stage of the assembly process indicates that an issue of interest is present (operation 802). The issue of interest may be one of an improper part, an improper part location, an improper orientation, a crack, a dent, a twist, a surface inconsistency, or some other type of issue of interest. An improper part means that the wrong part has been added to the assembly. An improper part location may mean that a correct part has been assembled or added to the assembly at the wrong location. An improper orientation may mean that a correct part has the wrong orientation relative to the assembly.

If an issue of interest is not present, the process terminates. Otherwise, if an issue of interest is present, the current stage of the assembly process is selected for processing (operation 804). A record corresponding to the selected stage is retrieved from a history in a data repository and analyzed (operation 806).

Thereafter, a determination is made as to whether the root cause of the issue of interest occurred during the selected stage of the assembly process (operation 808). If the root cause occurred during the selected stage of the assembly process, a report is generated (operation 810), with the process terminating thereafter. The report may be an alert or a notice of information regarding the issue of interest. In some cases, the report includes images, video, or both to better inform a human operator about the issue.

If, however, the root cause did not occur during the selected stage of the assembly process, a determination is made as to whether the selected stage was the initial stage of the assembly process (operation 812). If the selected stage was the initial stage of the assembly process, the process proceeds to operation 810 described above. Here, the report may take the form of a notification, an alert, or a substantive report indicating that the root cause could not be identified.

If the selected stage was not the initial stage of the assembly process, then a stage of the assembly process that occurred immediately prior to the selected stage is selected for processing (operation 814), with the process then returning to operation 806 as described above. In this manner, process 800 rolls back through the history of records stored in the data repository in an efficient manner. Information about prior assembly steps may be analyzed and evaluated without requiring human intervention or requiring extensive disassembly (e.g., a reversal of the assembly steps already performed).

Accordingly, this type of rollback verification allows automated inspection and quality control of the assembly process in a manner that may be too difficult or time-consuming for a human operator to perform. A human operator might have to reverse the assembly process and disassemble a portion of the assembly in order to identify a root case of an issue. However, the rollback verification process described above is an automated method for identifying the root cause of an issue that occurred prior to the current stage of assembly easily, quickly, and efficiently.

Figure 9:
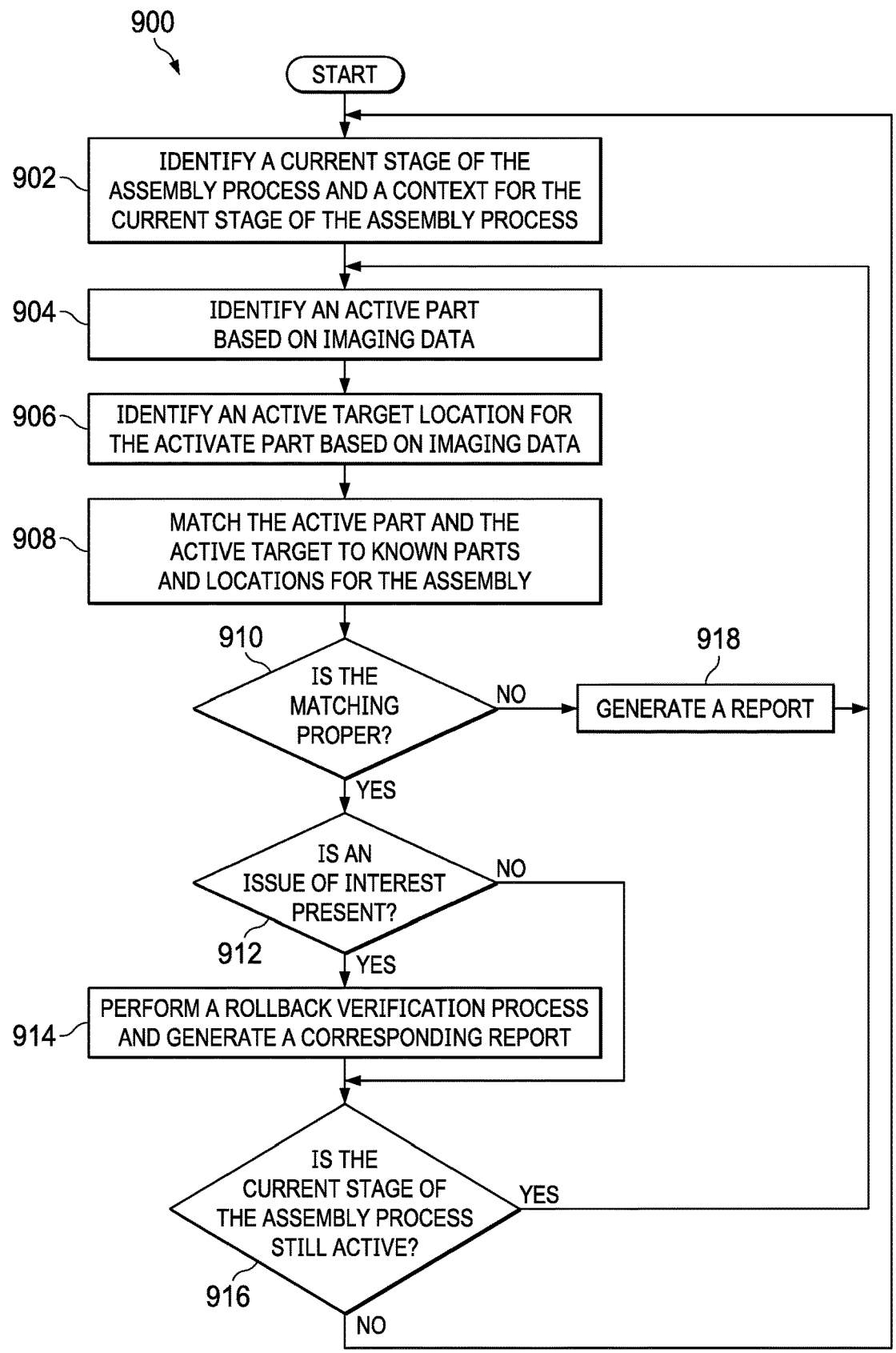
FIG. 9 is a flowchart of a process for automated supervision and inspection of an assembly process in accordance with an example embodiment.

FIG. 9 is a flowchart of a process for automated supervision and inspection of an assembly process in accordance with an example embodiment. Process 900 illustrated in FIG. 9 may be performed using supervision and inspection system 112 described in FIGS. 1-3.

Process 900 may begin by identifying a current stage of the assembly process and a context for the current stage of the assembly process (operation 902). Next, an active part is identified based on imaging data (operation 904). The imaging data may be generated by one or more cameras in fixed positions relative to an assembly site. The active part may be, for example, the part being held by a human operator or a robot for installation. The identification performed in operation 904 may be performed using machine learning, computer vision, or other types of learning techniques.

Thereafter, an active target location is identified for the active part based on imaging data (operation 906). The active target location may be identified using machine learning, computer vision, or other types of learning techniques and 3D models of the assembly site or the assembly to be built. In some illustrative examples, the target location may be identified through proximity-based detections combined with active-assembly detections once the operator begins the task of installing the part.

Next, the active part and the active target location are matched to known parts for the assembly (operation 908). A determination is made as to whether this matching is proper (operation 910). The match may be considered proper when the combination of the active part and the active target location are correct for the current stage of the assembly process.

If the match is proper, imaging data is used to determine whether an issue of interest is present (operation 912). This determination may be made based on machine learning, computer vision, or other types of learning algorithms. In operation 912, the determination is made based on known types of issues and predefined quality metrics.

If an issue is present, a rollback verification process is performed to identify the root cause of the issue and a corresponding report is generated (operation 914). The process then determines whether the current stage of the assembly process is still active (operation 916). The current stage is considered still active if there are additional steps or tasks to be performed as part of this stage of the assembly process. If the current stage is still active, the process returns to operation 904 described above. Otherwise, the process returns to operation 902 described above.

With reference again to operation 912, if no issue of interest is present, the process proceeds to operation 916. With reference again to operation 910, if the match is not proper, a report is generated (operation 918), with the process then proceeding to operation 904 as described above. This allows the human operator or robot to select either a new active part or a new active target location.

By returning to operation 902 after operation 918, the process may "advance" the active stage of the assembly process and use a new context for decision-making. When there is no next stage to advance to, the assembly process is complete. Thus, the process iterates until the assembly process has been completed.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 10:
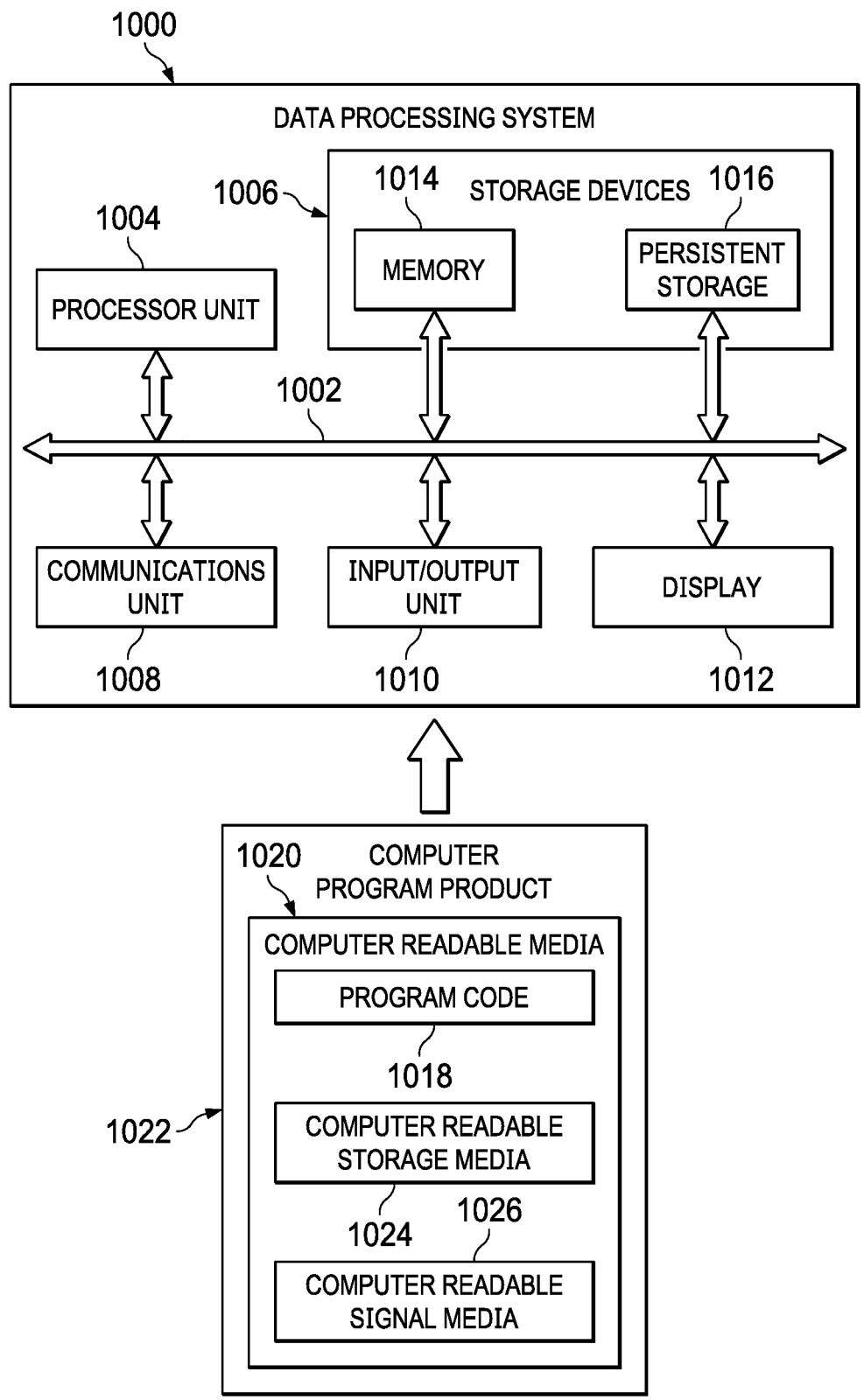
FIG. 10 is a block diagram of a data processing system in accordance with an example embodiment.

Turning now to FIG. 10, an illustration of a data processing system in the form of a block diagram is depicted in accordance with an illustrative embodiment. Data processing system 1000 may be used to implement computer system 124 in FIG. 1. As depicted, data processing system 1000 includes communications framework 1002, which provides communications between processor unit 1004, storage devices 1006, communications unit 1008, input/output unit 1010, and display 1012. In some cases, communications framework 1002 may be implemented as a bus system.

Processor unit 1004 is configured to execute instructions for software to perform a number of operations. Processor unit 1004 may comprise a number of processors, a multi-processor core, and/or some other type of processor, depending on the implementation. In some cases, processor unit 1004 may take the form of a hardware unit, such as a circuit system, an application specific integrated circuit (ASIC), a programmable logic device, or some other suitable type of hardware unit.

Instructions for the operating system, applications, and/or programs run by processor unit 1004 may be located in storage devices 1006. Storage devices 1006 may be in communication with processor unit 1004 through communications framework 1002. As used herein, a storage device, also referred to as a computer readable storage device, is any piece of hardware capable of storing information on a temporary and/or permanent basis. This information may include, but is not limited to, data, program code, and/or other information.

Memory 1014 and persistent storage 1016 are examples of storage devices 1006. Memory 1014 may take the form of, for example, a random access memory or some type of volatile or non-volatile storage device. Persistent storage 1016 may comprise any number of components or devices. For example, persistent storage 1016 may comprise a hard drive, a flash memory, a rewritable optical disk, a rewritable magnetic tape, or some combination of the above. The media used by persistent storage 1016 may or may not be removable.

Communications unit 1008 allows data processing system 1000 to communicate with other data processing systems and/or devices. Communications unit 1008 may provide communications using physical and/or wireless communications links.

Input/output unit 1010 allows input to be received from and output to be sent to other devices connected to data processing system 1000. For example, input/output unit 1010 may allow user input to be received through a keyboard, a mouse, and/or some other type of input device. As another example, input/output unit 1010 may allow output to be sent to a printer connected to data processing system 1000.

Display 1012 is configured to display information to a user. Display 1012 may comprise, for example, without limitation, a monitor, a touch screen, a laser display, a holographic display, a virtual display device, and/or some other type of display device.

In this illustrative example, the processes of the different illustrative embodiments may be performed by processor unit 1004 using computer-implemented instructions. These instructions may be referred to as program code, computer usable program code, or computer readable program code and may be read and executed by one or more processors in processor unit 1004.

In these examples, program code 1018 is located in a functional form on computer readable media 1020, which is selectively removable, and may be loaded onto or transferred to data processing system 1000 for execution by processor unit 1004. Program code 1018 and computer readable media 1020 together form computer program product 1022. In this illustrative example, computer readable media 1020 may be computer readable storage media 1024 or computer readable signal media 1026.

Computer readable storage media 1024 is a physical or tangible storage device used to store program code 1018 rather than a medium that propagates or transmits program code 1018. Computer readable storage media 1024 may be, for example, without limitation, an optical or magnetic disk or a persistent storage device that is connected to data processing system 1000.

Alternatively, program code 1018 may be transferred to data processing system 1000 using computer readable signal media 1026. Computer readable signal media 1026 may be, for example, a propagated data signal containing program code 1018. This data signal may be an electromagnetic signal, an optical signal, and/or some other type of signal that can be transmitted over physical and/or wireless communications links.

The illustration of data processing system 1000 in FIG. 10 is not meant to provide architectural limitations to the manner in which the illustrative embodiments may be implemented. The different illustrative embodiments may be implemented in a data processing system that includes components in addition to or in place of those illustrated for data processing system 1000. Further, components shown in FIG. 10 may be varied from the illustrative examples shown.

Figure 11:
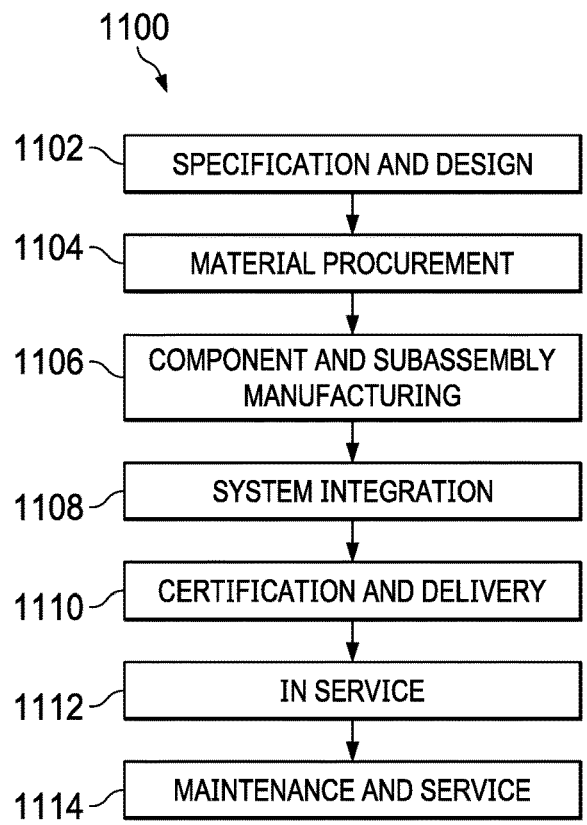
FIG. 11 is an illustration of an aircraft manufacturing and service method in accordance with an illustrative embodiment in accordance with an example embodiment.
Figure 12:
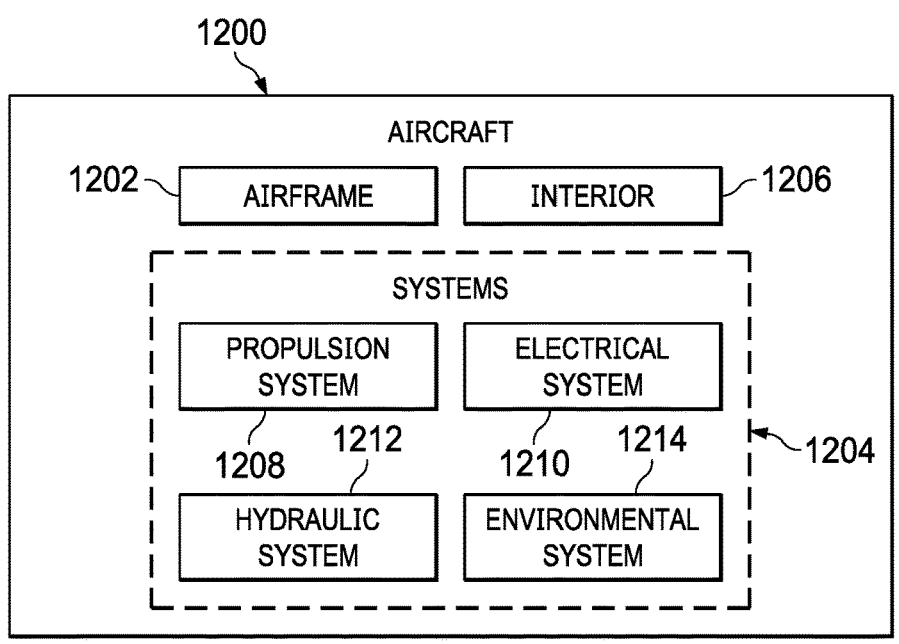
FIG. 12 is a block diagram of an aircraft in accordance with an example embodiment.

Illustrative embodiments of the disclosure may be described in the context of aircraft manufacturing and service method 1100 as shown in FIG. 11 and aircraft 1200 as shown in FIG. 12. Turning first to FIG. 11, an illustration of an aircraft manufacturing and service method is depicted in accordance with an illustrative embodiment. During pre-production, aircraft manufacturing and service method 1100 may include specification and design 1102 of aircraft 1200 in FIG. 12 and material procurement 1104.

During production, component and subassembly manufacturing 1106 and system integration 1108 of aircraft 1200 in FIG. 12 takes place. Thereafter, aircraft 1200 in FIG. 12 may go through certification and delivery 1110 in order to be placed in service 1112. While in service 1112 by a customer, aircraft 1200 in FIG. 12 is scheduled for routine maintenance and service 1114, which may include modification, reconfiguration, refurbishment, and other maintenance or service.

Each of the processes of aircraft manufacturing and service method 1100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of an aircraft is depicted in which an illustrative embodiment may be implemented. In this example, aircraft 1200 is produced by aircraft manufacturing and service method 1100 in FIG. 11 and may include airframe 1202 with plurality of systems 1204 and interior 1206. Examples of systems 1204 include one or more of propulsion system 1208, electrical system 1210, hydraulic system 1212, and environmental system 1214. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1100 in FIG. 11. In particular, structure 104 from FIG. 1 may be manufactured during any one of the stages of aircraft manufacturing and service method 1100. For example, without limitation, assembly 110 may be built using plurality of parts 102 during at least one of component and subassembly manufacturing 1106, system integration 1108, routine maintenance and service 1114, or some other stage of aircraft manufacturing and service method 1100. Further, supervision and inspection system 112 may provide automated supervision and inspection of the assembly process for building assembly 110. Supervision and inspection system 112 may be used to automate the supervision and inspection of a structure that is part of airframe 1202, interior 1206, or some other portion of aircraft 1200.

In one illustrative example, components or subassemblies produced in component and subassembly manufacturing 1106 in FIG. 11 may be fabricated or manufactured in a manner similar to components or subassemblies produced while aircraft 1200 is in service 1112 in FIG. 11. As yet another example, one or more apparatus embodiments, method embodiments, or a combination thereof may be utilized during production stages, such as component and subassembly manufacturing 1106 and system integration 1108 in FIG. 11. One or more apparatus embodiments, method embodiments, or a combination thereof may be utilized while aircraft 1200 is in service 1112 and/or during maintenance and service 1114 in FIG. 11. The use of a number of the different illustrative embodiments may substantially expedite the assembly of and/or reduce the cost of aircraft 1200.

Thus, the example embodiments provide automated systems and methods for supervision and inspection of an assembly process. Although the automated systems and methods for supervision and inspection may be used for the assembly of other types of vehicles and vehicle structures (e.g., automotive assembly, spacecraft assembly, etc.).

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required. For example, without limitation, "at least one of item A, item B, or item C" or "at least one of item A, item B, and item C" may mean item A; item A and item B; item B; item A, item B, and item C; item B and item C; or item A and C. In some cases, "at least one of item A, item B, or item C" or "at least one of item A, item B, and item C" may mean, but is not limited to, two of item A, one of item B, and ten of item C; four of item B and seven of item C; or some other suitable combination.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

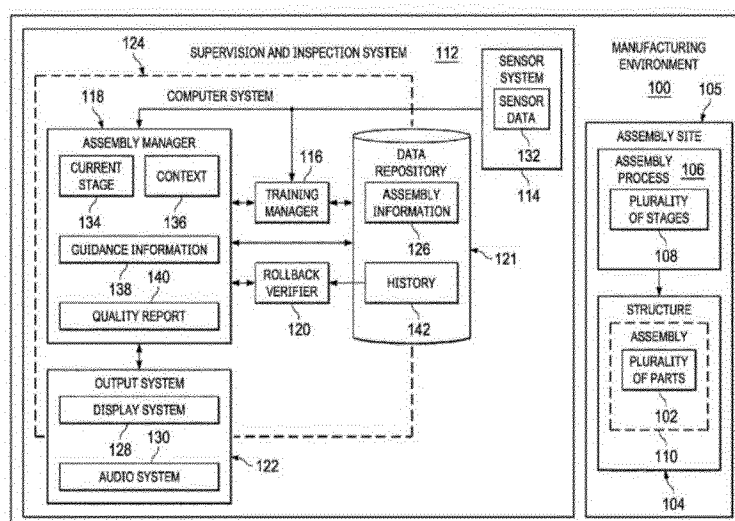

What is claimed is:

1. A method for performing automated supervision and inspection of an assembly process, the method being implemented using a computer system and comprising:
generating sensor data at an assembly site using a sensor system positioned relative to the assembly site;
identifying, by the computer system, a current stage of a plurality of stages in the assembly process for building an assembly at the assembly site based on the sensor data and assembly process flow data that includes information about a sequence of the plurality of stages, wherein identifying the current stage includes detecting a plurality of objects using the sensor data and matching at least a portion of the plurality of objects to parts for the assembly such that the portion of the plurality of objects matched to the parts is a plurality of matched objects;
identifying, by the computer system, a context for the current stage;
generating, by the computer system, a quality report for the assembly corresponding to the current stage based on the sensor data and the context for the current stage; and
storing, by the computer system, a record corresponding to the current stage of the assembly process in a data repository to thereby build a history of records for the assembly process, wherein the record includes at least a portion of the sensor data, the quality report, an identification of the plurality of objects, and an identification of the plurality of matched objects.

2. The method of claim 1, wherein generating the sensor data comprises:
generating imaging data using a set of imaging systems positioned relative to the assembly and the assembly site, wherein the imaging data comprises at least one of two-dimensional imaging data or three-dimensional imaging data.

3. The method of claim 1, wherein the quality report includes an overall stage assessment that identifies a grade for the current stage of the assembly process, and wherein the grade indicates how the current stage has progressed with respect to selected tolerances and is selected from a plurality of grade levels that includes pass, borderline, and fail.

4. The method of claim 1, wherein matching the at least a portion of the plurality of objects to the parts comprises:
matching, by the computer system, the at least a portion of the plurality of objects to the parts for the assembly using at least one of images of the parts or models of the parts.

5. The method of claim 1, wherein matching the at least a portion of the plurality of objects to the parts comprises:
matching, by the computer system, the at least a portion of the plurality of objects to the parts for the assembly using at least one of machine learning, deep learning, computer vision, a customized learning technique, computational learning, or artificial intelligence learning.

6. The method of claim 4, wherein identifying, by the computer system, the current stage of the assembly process further comprises:
determining, by the computer system, at least one of a plurality of locations or a plurality of orientations for the plurality of matched objects with respect to a reference coordinate system for the assembly site; and
determining, by the computer system, the current stage of the assembly process based on an identification of the plurality of matched objects and the at least one of the plurality of locations or the plurality of orientations for the plurality of matched objects.

7. The method of claim 6, wherein identifying, by the computer system, the context comprises:
determining, by the computer system, the context for the current stage of the assembly process using context information stored in a data repository, wherein the context includes at least one of a nominal condition for the assembly at the current stage, a nominal condition for each part expected to be present at the current stage, selected tolerances for the nominal condition for the assembly at the current stage, an identification of steps completed prior to the current stage, an identification of steps to be completed during the current stage, or an identification of steps to be completed after the current stage.

8. The method of claim 6, wherein generating, by the computer system, the quality report comprises:
generating, by the computer system, a matching assessment that indicates whether one or more of the plurality of objects detected is unable to be matched to a corresponding part and whether one or more of the plurality of matched objects does not match a part that is expected to be present at the current stage of the assembly process.

9. The method of claim 6, wherein generating, by the computer system, the quality report comprises:
generating, by the computer system, a location assessment that indicates whether each of the plurality of matched objects has been assembled in a correct or incorrect location based on the context for the current stage of the assembly process.

10. The method of claim 6, wherein generating, by the computer system, the quality report comprises:
generating, by the computer system, an inconsistency assessment that indicates whether any features have been identified and whether any identified features are outside of selected tolerances, wherein a feature is selected from one of a crack, a dent, a twist, or a surface level feature.

11. The method of claim 10, further comprising:
detecting, by the computer system, one or more features in the assembly using at least one of machine learning, deep learning, computer vision, a customized learning technique, computational learning, or artificial intelligence learning.

12. The method of claim 1, further comprising:
generating, by the computer system, guidance information for guiding a human operator during the assembly process based on the context for the current stage of the assembly process.

13. The method of claim 12, wherein generating the guidance information comprises:
generating, by the computer system, current stage guidance for use by the human operator to perform one or more tasks during the current stage of the assembly process.

14. The method of claim 12, wherein generating, by the computer system, the guidance information comprises:
generating, by the computer system, next stage guidance for use by the human operator to perform one or more tasks during a next stage of the assembly process.

15. The method of claim 12, further comprising:
displaying, by the computer system, the guidance information on a display system positioned relative to the assembly site, wherein the guidance information includes instructions for use by the human operator to perform at least one task in the assembly process during the current stage.

16. The method of claim 1, further comprising:
storing, by the computer system, the quality report as part of a record corresponding to the current stage of the assembly process in a data repository to thereby build a history of records for the assembly process.

17. The method of claim 1, further comprising:
determining, by the computer system, whether the quality report for the current stage of the assembly process indicates that an issue of interest is present; and
rolling back through the history of records, via the computer system, to identify a root cause of the issue of interest.

18. The method of claim 17, wherein rolling back through the history of records comprises:
analyzing, by the computer system, a first record corresponding to a selected stage of the assembly process immediately prior to the current stage of the assembly process.

19. The method of claim 18, wherein rolling back through the history of records further comprises:
determining, by the computer system, whether the root cause occurred during the selected stage; and
analyzing, by the computer system, a second record corresponding to another stage of the assembly process immediately prior to the selected stage.

20. A method for performing automated supervision and inspection of an assembly process, the method being implemented using a computer system and comprising:
- generating sensor data at an assembly site using a sensor system positioned relative to the assembly site;
- identifying, by the computer system, a current stage of a plurality of stages in the assembly process for building an assembly at the assembly site using the sensor data, assembly information stored in a data repository, and at least one of machine learning, deep learning, computer vision, a customized learning technique, computational learning, or artificial intelligence learning,
  - wherein the assembly information includes assembly process flow data that includes information about a sequence of the plurality of stages; and
  - wherein identifying the current stage includes detecting a plurality of objects using the sensor data and matching at least a portion of the plurality of objects to parts for the assembly such that the portion of the plurality of objects matched to the parts is a plurality of matched objects;
- identifying, by the computer system, a context for the current stage;
- generating, by the computer system, a quality report for the assembly corresponding to the current stage based on the sensor data and the context for the current stage, wherein the quality report includes an overall stage assessment that indicates a quality of the current stage of the assembly process; and
- storing, by the computer system, a record corresponding to the current stage of the assembly process in the data repository to thereby build a history of records for the assembly process, wherein the record includes at least a portion of the sensor data, an identification of the plurality of objects, an identification of the plurality of matched objects, and the quality report.

21. The method of claim 20, further comprising:
- determining, by the computer system, whether the quality report for the current stage of the assembly process indicates that at least one issue of interest is present, wherein the at least one issue of interest is selected from one of an improper part, an improper part location, an improper orientation, a crack, a dent, a twist, and a surface inconsistency.

22. The method of claim 21, further comprising:
- rolling back through the history of records, via the computer system, to identify a root cause of the at least one issue of interest.

23. The method of claim 20, further comprising:
- generating, by the computer system, at least one of current stage guidance or next stage guidance for use by a human operator during the assembly process.

24. The method of claim 23, further comprising:
- displaying, by the computer system, the at least one of the current stage guidance or the next stage guidance on a display system.

25. The method of claim 20, further comprising:
- presenting, by the computer system, at least a portion of the quality report on a display system, wherein the overall stage assessment includes a grade that indicates how the current stage has progressed with respect to selected tolerances.

26. A system for automated supervision and inspection of an assembly process, the system comprising:
- a sensor system positioned relative to an assembly site and an assembly being built at the assembly site; and
- a computer system that:
  - identifies a current stage of a plurality of stages in the assembly process for building the assembly at the assembly site based on sensor data generated by the sensor system and assembly process flow data that includes information about a sequence of the plurality of stages, wherein identifying the current stage includes detecting a plurality of objects using the sensor data and matching at least a portion of the plurality of objects to parts for the assembly such that the portion of the plurality of objects matched to the parts is a plurality of matched objects;
  - identifies a context for the current stage;
  - generates a quality report for the assembly corresponding to the current stage based on the sensor data and the context for the current stage, and
  - stores a record corresponding to the current stage of the assembly process in a data repository to thereby build a history of records for the assembly process, wherein the record includes at least a portion of the sensor data, the quality report, an identification of the plurality of objects, and an identification of the plurality of matched objects.

27. The system of claim 26, wherein the sensor system includes at least one camera positioned relative to the assembly site and wherein the camera generates two-dimensional imaging data.

28. The system of claim 26, wherein the computer system identifies the current stage of the assembly process using the sensor data, assembly information stored in a data repository, and at least one of machine learning, deep learning, computer vision, a customized learning technique, computational learning, or artificial intelligence learning.

29. The system of claim 28, wherein the assembly information includes at least one of a part images library, a part models library, assembly process flow data, assembly site model data, assembly model data, assembly video data, or feature data.

30. The system of claim 26, wherein the context includes at least one of a nominal condition for the assembly at the current stage, a nominal condition for each part expected to be present at the current stage, selected tolerances for the nominal condition for the assembly at the current stage, an identification of steps completed prior to the current stage, an identification of steps to be completed during the current stage, or an identification of steps to be completed after the current stage.

* * * * *

UNITED STATES PATENT AND TRADEMARK OFFICE
CERTIFICATE OF CORRECTION

PATENT NO. : 11,442,438 B2
APPLICATION NO. : 16/523762
DATED : September 13, 2022
INVENTOR(S) : Huafeng Yu, Daniel S. ReMine and Tyler Charles Staudinger It is certified that error appears in the above-identified patent and that said Letters Patent is hereby corrected as shown below:

On the Title Page

Please replace the title page with the attached title page showing the correct number of claims In the Claims Please cancel Claim 16

Signed and Sealed this
Twentieth Day of February, 2024

Katherine Kelly Vidal
*Director of the United States Patent and Trademark Office*

(12) United States Patent
Yu et al.

(10) Patent No.: US 11,442,438 B2
(45) Date of Patent: Sep. 13, 2022

(54) AUTOMATED SUPERVISION AND INSPECTION OF ASSEMBLY PROCESS

(71) Applicant: The Boeing Company, Chicago, IL (US)

(72) Inventors: Huafeng Yu, Madison, AL (US); Daniel S. ReMine, Madison, AL (US); Tyler Charles Staudinger, Huntsville, AL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/523,762

(22) Filed: Jul. 26, 2019

(65) Prior Publication Data
US 2020/0057432 A1     Feb. 20, 2020

Related U.S. Application Data

(60) Provisional application No. 62/718,786, filed on Aug. 14, 2018.

(51) Int. Cl.
*G05B 19/418* (2006.01)
*G06N 20/00* (2019.01)
*G06K 9/62* (2022.01)

(52) U.S. Cl.
CPC ... *G05B 19/41885* (2013.01); *G05B 19/4188* (2013.01); *G05B 19/41875* (2013.01); *G06K 9/6201* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 9,612,725 B1 | 4/2017 | Senesac | |
| 2012/0136470 A1* | 5/2012 | Deans | G05B 19/41875 700/110 |
| 2012/0308969 A1* | 12/2012 | Rataul | G05B 19/41865 434/224 |
| 2012/0327215 A1* | 12/2012 | Case | H05K 13/0815 348/92 |
| 2015/0012171 A1* | 1/2015 | Richter | B64F 5/60 701/32.9 |
| 2017/0024613 A1* | 1/2017 | Shivaram | G06K 9/3216 |
| 2017/0206428 A1 | 7/2017 | Weiss et al. | |
| 2018/0082414 A1 | 3/2018 | Rozenberg et al. | |
| 2019/0212721 A1* | 7/2019 | Kesler | G05B 19/41885 |

(Continued)

OTHER PUBLICATIONS

Remine et al., U.S. Appl. No. 16/523,790, filed Jul. 26, 2019.

(Continued)

*Primary Examiner* — Ryan A Jarrett
(74) *Attorney, Agent, or Firm* — Haynes and Boone, LLP

(57) ABSTRACT

A method and apparatus for performing automated supervision and inspection of an assembly process. The method is implemented using a computer system. Sensor data is generated at an assembly site using a sensor system positioned relative to the assembly site. A current stage of an assembly process for building an assembly at the assembly site is identified using the sensor data. A context for the current stage is identified. A quality report for the assembly is generated based on the sensor data and the context for the current stage.

29 Claims, 11 Drawing Sheets